United States Patent
Valentine et al.

(10) Patent No.: US 7,569,082 B2
(45) Date of Patent: Aug. 4, 2009

(54) MANUFACTURE OF UNITIZED ELECTRODE ASSEMBLY FOR PEM FUEL CELLS

(75) Inventors: Seth Valentine, Livonia, NY (US); Ronald L. James, North Chili, NY (US); John P. Healy, Pittsford, NY (US); Balsu Lakshmanan, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 891 days.

(21) Appl. No.: 10/960,880

(22) Filed: Oct. 7, 2004

(65) Prior Publication Data

US 2006/0075630 A1    Apr. 13, 2006

(51) Int. Cl.
*H01M 6/00* (2006.01)
*B05D 5/12* (2006.01)

(52) U.S. Cl. .................. 29/623.1; 427/115
(58) Field of Classification Search ............ None
See application file for complete search history.

(56) References Cited

U.S. PATENT DOCUMENTS

| | | | | |
|---|---|---|---|---|
| 5,857,883 A * | 1/1999 | Knickerbocker et al. | ...... | 445/23 |
| 6,696,382 B1 * | 2/2004 | Zelenay et al. | ............ | 502/168 |
| 2003/0082430 A1 * | 5/2003 | Suzuki | ................. | 429/36 |
| 2003/0224233 A1 * | 12/2003 | Kohler et al. | ............. | 429/30 |
| 2005/0181267 A1 * | 8/2005 | Mitsuta et al. | ............. | 429/40 |
| 2006/0022081 A1 * | 2/2006 | Puffer, Jr. | ............. | 242/523 |

FOREIGN PATENT DOCUMENTS

| | | | |
|---|---|---|---|
| JP | 2002343377 A | * | 11/2002 |
| WO | 2004040681 A1 | | 5/2004 |

OTHER PUBLICATIONS

Official English translation of JP 2002-343377.*

* cited by examiner

*Primary Examiner*—Patrick Ryan
*Assistant Examiner*—R. Hodge

(57) ABSTRACT

A process for fabricating a unitized electrode assembly for a polyelectrolyte membrane is disclosed. The process includes providing a gas diffusion medium and a membrane electrode assembly, printing an adhesive on the gas diffusion medium, locating the gas diffusion medium relative to the membrane electrode assembly and pressing the gas diffusion medium and the adhesive against the membrane electrode assembly.

7 Claims, 2 Drawing Sheets

MANUFACTURE OF UNITIZED ELECTRODE ASSEMBLY FOR PEM FUEL CELLS

FIELD OF THE INVENTION

The present invention relates to fuel cells which generate electricity to power vehicles or other machinery. More particularly, the present invention relates to a novel fabrication process for a unitized electrode assembly (UEA) to improve tolerances and performance of the UEA in a fuel cell.

BACKGROUND OF THE INVENTION

A membrane electrode assembly (MEA) for a fuel cell includes an ionomer membrane which is coated with catalyst layers on opposite sides. Gas diffusion medium (GDM) layers are attached to or abut against the respective catalyst layers. In the fuel cell, a bipolar plate having flow field channels abuts against each GDM layer for the flow of reaction and by-product gases.

For multiple reasons, it is preferred to integrate the catalyst layers and the ionomer membrane of the MEA with the gas diffusion medium (GDM) layers into a single component which is known as a unitized electrode assembly (UEA). As the GDM layers are attached to the MEA, several criteria must be met. First, the attachment process must not alter the properties of the ionomer membrane or catalyst. This requires precise control of the bonding temperature and pressure.

Second, the attachment process must not alter the properties of the GDM layers. This requires avoidance of gross mistakes such as denting, scratching and tearing of the GDM, as well as precise control of attachment process parameters such as the magnitude of pressure applied to the GDM. Third, the interface between the GDM and each catalyst layer must remain unaffected by the attachment process.

Fourth, if adhesive is used to attach the GDM to the MEA, the adhesive must not adversely affect GDM performance. Fifth, the GDM must be precisely positioned with respect to the MEA during attachment. If the attachment process is capable of only marginal tolerances, the UEA will cause an overall fuel cell size increase. Additionally, there are performance and stability issues associated with large tolerances in GDM placement.

There are several important considerations which relate to the application of adhesive to the GDM. One of these considerations is the need to facilitate precise positioning of the adhesive on the GDM, since such positioning can affect the performance, size and durability of the fuel cell. Another important consideration involves the need to apply a layer of adhesive having minimal thickness such that compression of or local stress concentration in the active area of the MEA is avoided. Furthermore, the adhesive must be compatible with a fuel cell environment and must not introduce any contaminants to the MEA or GDM.

Therefore, a fabrication process for a UEA is needed which satisfies the above-mentioned criteria and results in a UEA that is characterized by enhanced tolerances and performance in a fuel cell.

SUMMARY OF THE INVENTION

The present invention is generally directed to a novel fabrication process for a unitized electrode assembly (UEA) to improve tolerances and performance of the UEA in a fuel cell. The fabrication process includes precisely applying an adhesive to a gas diffusion medium (GDM) using a silkscreen or other printing method, precisely locating the GDM relative to a membrane electrode assembly (MEA), and lightly pressing the GDM onto the MEA without the use of excessive temperature or pressure.

BRIEF DESCRIPTION OF THE DRAWINGS

The invention will now be described, by way of example, with reference to the accompanying drawings, in which.

DETAILED DESCRIPTION OF THE INVENTION

The present invention contemplates a novel unitized electrode assembly (UEA) fabrication process which results in a UEA that is characterized by improved tolerances and performance in a fuel cell. According to the UEA fabrication process of the invention, an adhesive is printed on a gas diffusion medium (GDM) using a silkscreen or other printing method. The GDM is then precisely located relative to a membrane electrode assembly (MEA), and then lightly pressed onto the MEA without the use of excessive temperature or pressure. The UEA fabrication process can be carried out as a batch process, although the process is amenable to high volume, continuous process production.

The UEA fabrication process is carried out in a clean room environment. Dust, dirt, metal filings, fibers and the like must be prevented from contacting the MEA or GDM during the entire process. Any debris present on the MEA or GDM during the process must be removed prior to UEA assembly.

Figure 1:
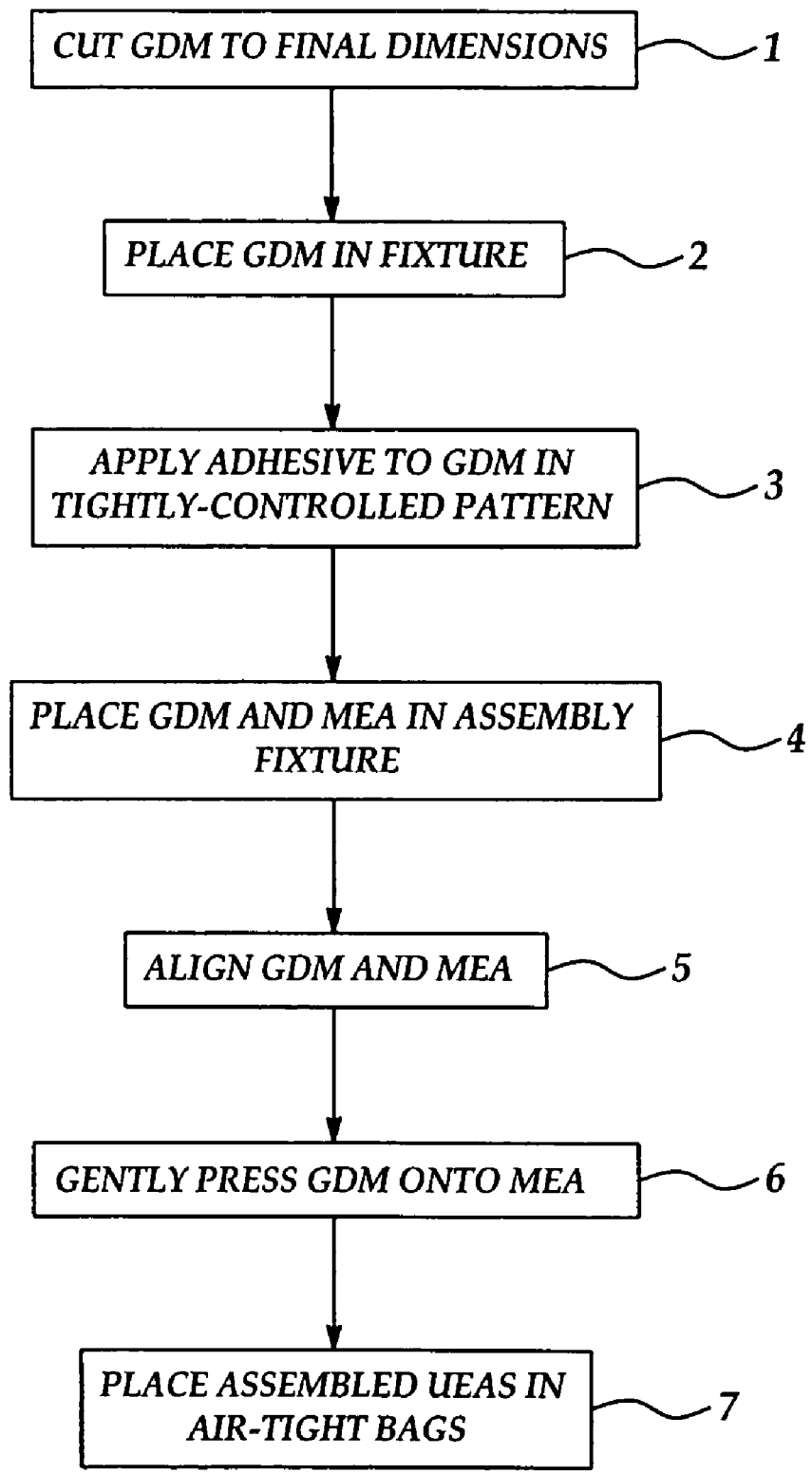
FIG. 1 is a flow diagram which illustrates sequential process steps carried out according to a typical embodiment of the UEA fabrication process of the present invention.
Figure 2A:
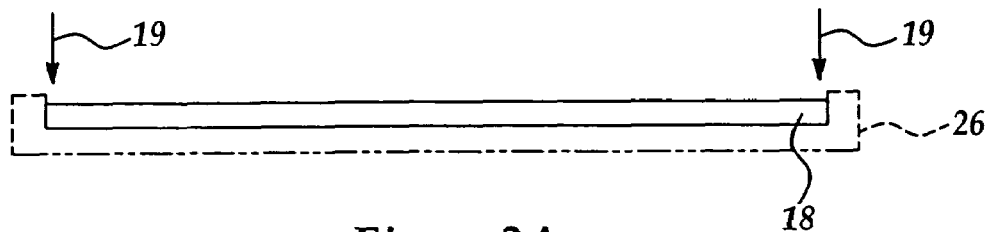
FIG. 2A is a side view of a gas diffusion medium (GDM), illustrating the printing of an adhesive onto the GDM.
Figure 2B:
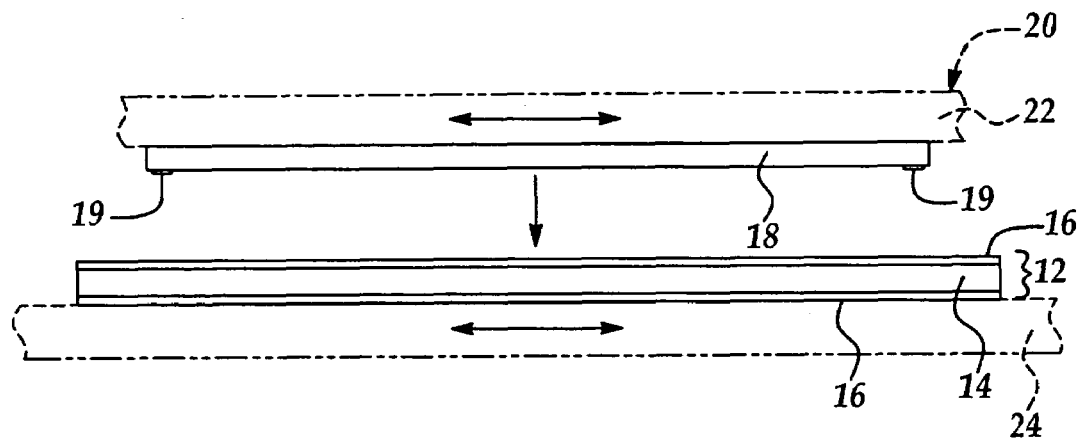
FIG. 2B is a side view of a MEA and a GDM, both of which are mounted in an assembly fixture (shown in phantom), and illustrating alignment of the GDM with the MEA prior to applying the GDM to the MEA.
Figure 2C:
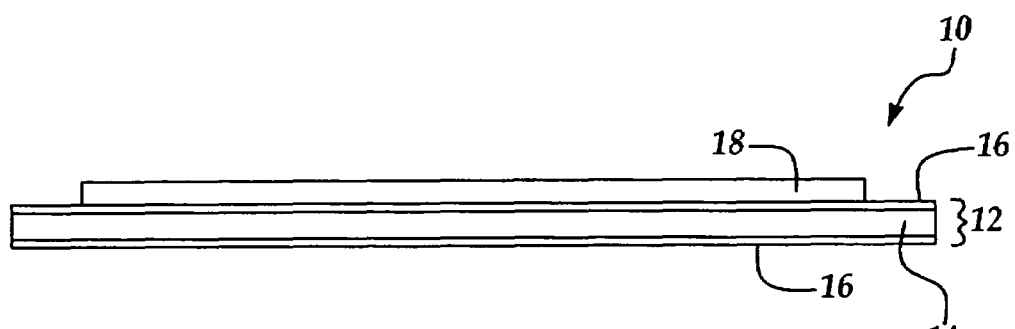
FIG. 2C is a side view of a UEA after the GDM is pressed onto the MEA.

Referring to the flow diagram of FIG. 1, in conjunction with FIGS. 2A-2C, the UEA fabrication process is begun by precisely cutting the GDM to the desired dimensions, as indicated in step 1 of FIG. 1. The cutting step will facilitate precise location of an adhesive on the GDM in a subsequent processing step which will be hereinafter described. Preferably, the cutting step is implemented outside a clean room environment, since the cutting process introduces particulate debris from the GDM which is being cut, into the environment. The cut GDM is typically then subjected to flowing air to remove extraneous debris therefrom.

As indicated in step 2 of FIG. 1, and as shown in FIG. 2A, the GDM 18 is next placed in a fixture 26 of a silkscreen printer, for example. The fixture 26 properly locates the GDM 18 in the printer for precise application of adhesive 19 to the GDM 18. Next, the silkscreen printer applies a thin layer of the adhesive 19 to the GDM 18 (step 3) in a precisely-controlled pattern, typically along the edges of the GDM 18. The screen mesh size is a design parameter that is used to control the thickness and distribution of the adhesive 19 on the GDM 18. Preferably, the adhesive 19 is uniformly distributed in the desired area of the GDM 18, without voids or excessive thickness. The adhesive 19 should not be more than 25μm thick.

The adhesive application step may be carried out as a batch printing process using the silkscreen printer, as described above. However, it is to be understood that the adhesive application step is not limited to silkscreen printing or batch printing. The adhesive 19 can be applied to the GDM 18 in a precisely-controlled pattern using a variety of techniques known to those skilled in the art, including but not limited to continuous process printing and decal transfer processes, for example.

After the adhesive 19 is applied to the GDM 18, the GDM 18 is removed from the fixture 26 of the silkscreen printer and placed in an assembly fixture 20, as shown in FIG. 2B and indicated in step 4 of FIG. 1. An MEA 12, having an ionomer membrane 14 which is coated on both sides with a catalyst layer 16, is also placed in the assembly fixture 20. The GDM 18 is located on a vacuum support 22, and the MEA 12 is located on a vacuum support 24 which is spaced-apart from the vacuum support 22, of the assembly fixture 20 using precise datums (step 5 in FIG. 1). Once the GDM 18 is precisely located on the vacuum support 22 and the MEA 12 is precisely located on the vacuum support 24, vacuum pressure is applied by the vacuum supports 22, 24 to hold the GDM 18 and MEA 12, respectively, in place. In the assembly fixture 20, the adhesive 19, which was previously applied to the GDM 18 in step 3, faces the catalyst layer 16 on the MEA 12 to which the GDM 18 is to be attached.

Precise location of the GDM 18 and MEA 12 in the assembly fixture 20 requires control of the temperature and humidity of the clean room. The size of the MEA 12 will change as a function of the ambient humidity and temperature. Thus, excessive levels of humidity or temperature in the clean room environment will render impossible alignment of the GDM 18 with respect to the MEA 12 to within narrow tolerances. The temperature and humidity ranges which are permissible for the clean room environment during this step of the UEA fabrication process will depend on the particular type of GDM and MEA used. Ambient humidity and temperature levels which are optimum for the UEA fabrication process are about 42±7% relative humidity and about 21±2 degrees C. Moreover, the magnitude of vacuum pressure applied to the GDM 18 by the assembly fixture 20 must be adjusted according to the properties of the GDM 18, since various types of GDM 18 exhibit variations in gas permeation rates, and therefore, require various magnitudes of vacuum pressure to hold them in place.

Due to the fragility of the ionomer membrane 14 in the MEA 12, vacuum pressure should not be applied to active areas of the ionomer membrane 14 during positioning of the MEA 12 in the assembly fixture 20. Otherwise, the membrane 14 has a tendency to wrinkle or crease the catalyst layers 16. Therefore, it is necessary to adjust both the position of vacuum openings (not shown) in the vacuum support 24 with respect to the MEA 12, as well as the magnitude of vacuum pressure applied by the vacuum support 24 against the MEA 12, based on the architecture of the MEA 12.

After the GDM 18 and MEA 12 have been precisely aligned in the assembly fixture 20, a UEA 10 is formed by pressing the GDM 18 onto the MEA 12 by operation of the assembly fixture 20, as shown in FIG. 2C and indicated in step 6 of FIG. 1. Depending on the tooling, this step can be carried out either in a continuous process or on a part-by-part basis. Three key controls are necessary for proper execution of this press-attachment step. First, the magnitude of vacuum pressure exerted on the GDM 18 and MEA 12, respectively, by the assembly fixture 20 must be timed appropriately with the pressing step. Preferably, automated control is used to achieve greater process control on both vacuum timing and press dwell times. Automated control of the vacuum timing and press dwell time will ensure that UEA and its components are transferred at the appropriate time from one process step to the next. If manual control is used, one could envision a scenario where human error could cause the vacuum pressure to shut off prematurely which may cause the UEA to have GDM location issues.

Second, the magnitude of pressure used to press the adhesive-coated GDM 18 to the MEA 12 must be tightly controlled. If too little pressure is used, the attachment bond will not be sufficiently robust to survive handling of the assembled UEA 10 during subsequent fabrication of a fuel cell. If excessive pressure is used, on the other hand, a permanent compression set will be induced in the GDM 18. This will compromise the functional capacity of the GDM 18 in the assembled fuel cell. The target pressure used to press the adhesive-coated GDM 18 to the MEA 12 is dependent on the type of GDM used. Third, the temperature and humidity of the clean room in which the press-attachment step is carried out must be controlled. Preferably, the relative humidity of the clean room is maintained at about 42±7% and the temperature is maintained at about 21±2 degrees C.

After the GDM 18 is pressed onto the MEA 12, the fabricated UEA 10 is removed from the assembly fixture 20. As indicated in step 7 of FIG. 1, the assembled UEAs 10 are placed in airtight bags (not shown) to prevent contamination and retain dimensional stability of the UEAs 10 pending assembly of the UEAs 10 into fuel cells.

While the preferred embodiments of the invention have been described above, it will be recognized and understood that various modifications can be made in the invention and the appended claims are intended to cover all such modifications which may fall within the spirit and scope of the invention.

What is claimed is:

1. A process comprising:
   providing a gas diffusion medium membrane electrode assembly and a first fixture;
   cutting said gas diffusion medium so that gas diffusion medium may be placed in the first fixture and so that the gas diffusion medium may be properly located in a printer;
   placing the gas diffusion medium in the first fixture so that the first fixture abuts the gas diffusion medium along at least two edges thereof;
   removing the gas diffusion medium from the first fixture;
   placing the gas diffusion medium on a first vacuum support, and applying a vacuum through the first vacuum support to bold the gas diffusion or medium in place;
   printing an adhesive in a controlled pattern on said gas diffusion medium while the gas diffusion medium is in the first fixture to a thickness that is thick enough to prevent voids yet less than 25 μm thick;
   locating said gas diffusion medium relative to said membrane electrode assembly; and
   pressing said gas diffusion medium and said adhesive against said membrane electrode assembly.

2. The method of claim 1 wherein said process is carried out at a temperature of from about 19 to about 23 degrees C. and a relative humidity of from about 37 to about 50 percent.

3. The method of claim 1 further comprising placing the membrane electrode assembly on a second vacuum support prior to the aligning.

4. The method of claim 1 wherein said pressing said gas diffusion medium and said adhesive against said membrane electrode assembly comprises pressing said gas diffusion medium and said adhesive against said membrane electrode assembly without inducing a permanent compression set in the gas diffusion medium.

5. The method of claim 1 wherein said printing an adhesive on said gas diffusion medium comprises printing said adhesive along edge portions of said gas diffusion medium.

6. The method of claim 1 wherein said printing an adhesive on said gas diffusion medium is a silkscreen printing process or a decal transfer process.

7. The method of claim 6 wherein said printing an adhesive on said gas diffusion medium is a batch printing process or continuous process printing.

* * * * *

UNITED STATES PATENT AND TRADEMARK OFFICE
CERTIFICATE OF CORRECTION

PATENT NO. : 7,569,082 B2 Page 1 of 1
APPLICATION NO. : 10/960880
DATED : August 4, 2009
INVENTOR(S) : Valentine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 896 days.

Signed and Sealed this

Seventh Day of September, 2010

David J. Kappos
*Director of the United States Patent and Trademark Office*